US006082616A

United States Patent [19]

Lewis et al.

[11] Patent Number: 6,082,616

[45] Date of Patent: Jul. 4, 2000

[54] AUTOMATED BANKING MACHINE ENCLOSURE

[75] Inventors: Kim R. Lewis, Stow; Richard C. Lute, Jr., Modadore; Terry E. Doll, Uniontown; Douglas A. Kovacs, Canton; Michael A. Durbin, Massillon; Deborah S. Addy, Canal Fulton; James A. Zweifel, Seville, all of Ohio

[73] Assignee: Diebold, Incorporated, North Canton, Ohio

[21] Appl. No.: 09/089,287

[22] Filed: Jun. 2, 1998

Related U.S. Application Data

[60] Provisional application No. 60/066,971, Nov. 28, 1997.

[51] Int. Cl.[7] .......... G06K 17/60

[52] U.S. Cl. .......... 235/379; 902/30

[58] Field of Search .......... 235/379, 486; 902/30, 31

[56] References Cited

U.S. PATENT DOCUMENTS

| | | | |
|---|---|---|---|
| 4,595,828 | 6/1986 | Lundblad | 235/379 |
| 4,754,126 | 6/1988 | Caldwell | 235/379 |
| 5,483,047 | 1/1996 | Ramachandran et al. | 235/379 |
| 5,719,383 | 2/1998 | Forrest | 235/379 |
| 5,804,804 | 9/1998 | Fukatsu | 235/379 |

*Primary Examiner*—Thien M. Le
*Assistant Examiner*—Daniel St. Cyr
*Attorney, Agent, or Firm*—Ralph E. Jocke; Daniel D. Wasil

[57] ABSTRACT

An automated banking machine (10) has a housing (12). A rollout tray (32) supports serviceable components including a display (36) and a keypad (48) thereon. The rollout tray includes a service opening (54) which is used to access service points on the serviceable components when the rollout tray is extended from the housing. When the tray is retracted access through the service opening is blocked.

31 Claims, 10 Drawing Sheets

AUTOMATED BANKING MACHINE ENCLOSURE

This application claims benefit of Provisional Appl No. 60/066,971, filed Nov. 28, 1997.

TECHNICAL FIELD

This invention relates to automated banking machines. Specifically this invention relates to an enclosure for an automated banking machine which is compact, but which has a large customer interface area.

BACKGROUND ART

Automated banking machines are well known in the prior art. A common type of automated banking machine is an automated teller machine (ATM). Automated banking machines may be used by customers to carry out banking transactions. Common banking transactions include dispensing cash, checking account balances and transferring funds between accounts. As used herein automated banking machine refers to any of the types of devices that enable carrying out transactions involving the transfer of funds or value electronically, including but not limited to ATMs, cash dispensers, credit card terminals, ticket dispensers, utility payment terminals, smart card value transfer terminals and devices that perform similar functions.

It is generally desirable to reduce the size of ATMs. This is particularly true of ATMs that are designed to be used as lobby units within the confines of a building. Most operators of facilities want an ATM to take up as little valuable floor space as possible.

Unfortunately when ATMs are made smaller there is a tendency to decrease the size of the interface area which includes components that customers use to operate the machine. Interface areas typically include a display which serves as an output device for providing messages to customers. The interface area of an ATM also generally includes a keypad and/or function buttons which serve as input devices. If the size of an interface area is reduced these components must become smaller. This can make the machine more difficult to operate.

Thus there exists a need for an automated banking machine which has a reduced size but which includes a large customer interface that is easy to operate.

DISCLOSURE OF INVENTION

It is an object of the present invention to provide an automated banking machine.

It is a further object of the present invention to provide an automated banking machine which has a relatively small size.

It is a further object of the present invention to provide an automated banking machine which is more readily serviced.

It is a further object of the present invention to provide an automated banking machine that provides a secure enclosure for critical components and valuable documents.

It is a further object of the present invention to provide an automated banking machine that has an attractive appearance.

It is a further object of the present invention to provide a method of operating an automated banking machine.

Further objects of the present invention will be made apparent in the following Best Modes for Carrying out Invention and the appended claims.

The foregoing objects are accomplished in a preferred embodiment of the invention by an automated banking machine which includes a housing bounding an interior area. The interior area has a first opening. The housing is mounted above a chest which houses critical components and valuable documents.

A rollout tray is movably mounted on the housing. The rollout tray is movable between a first position in which it extends outward from the housing, and a second position in which it is retracted into the interior area of the housing. The rollout tray has serviceable components thereon. The serviceable components include a display and a keypad.

The rollout tray includes a lower wall which has a service opening therein. The service opening is accessible from underneath the lower tray when the tray is in the extended position. An upper wall is supported on the rollout tray and extends above the service opening. The keypad is supported on the upper wall. Service points on the keypad are accessible through the service opening and the keypad is enabled to be removed from the machine by passing it through the service opening. The display includes at least one image adjusting knob. The image adjusting knob is disposed between the upper wall and the lower wall. The image adjusting knob is enabled to be accessed through the service opening when the rollout tray is in the extended position.

When the rollout tray is in the retracted position the service opening is not accessible from outside the housing. The rollout tray is biased outwardly but is selectively held in the retracted position by a lock. Releasing the lock causes the rollout tray to move outward so that the service opening is accessible from outside the housing of the machine.

The rollout tray further supports at least one device that retracts an item presented to, or provided by the customer, such as a invalid credit or debit card, or a card or transaction receipt, ticket, cash or other item not taken by the customer upon completion of the transaction. The item is retracted by the device and stored in an area of the device. An access door on the machine may be opened by authorized persons to remove items from the area when the rollout tray is in the retracted position. Alternatively, the rollout tray and the device may be moved outwardly so that the items can be removed from the area from outside the housing.

BEST MODES FOR CARRYING OUT INVENTION

Figure 1:
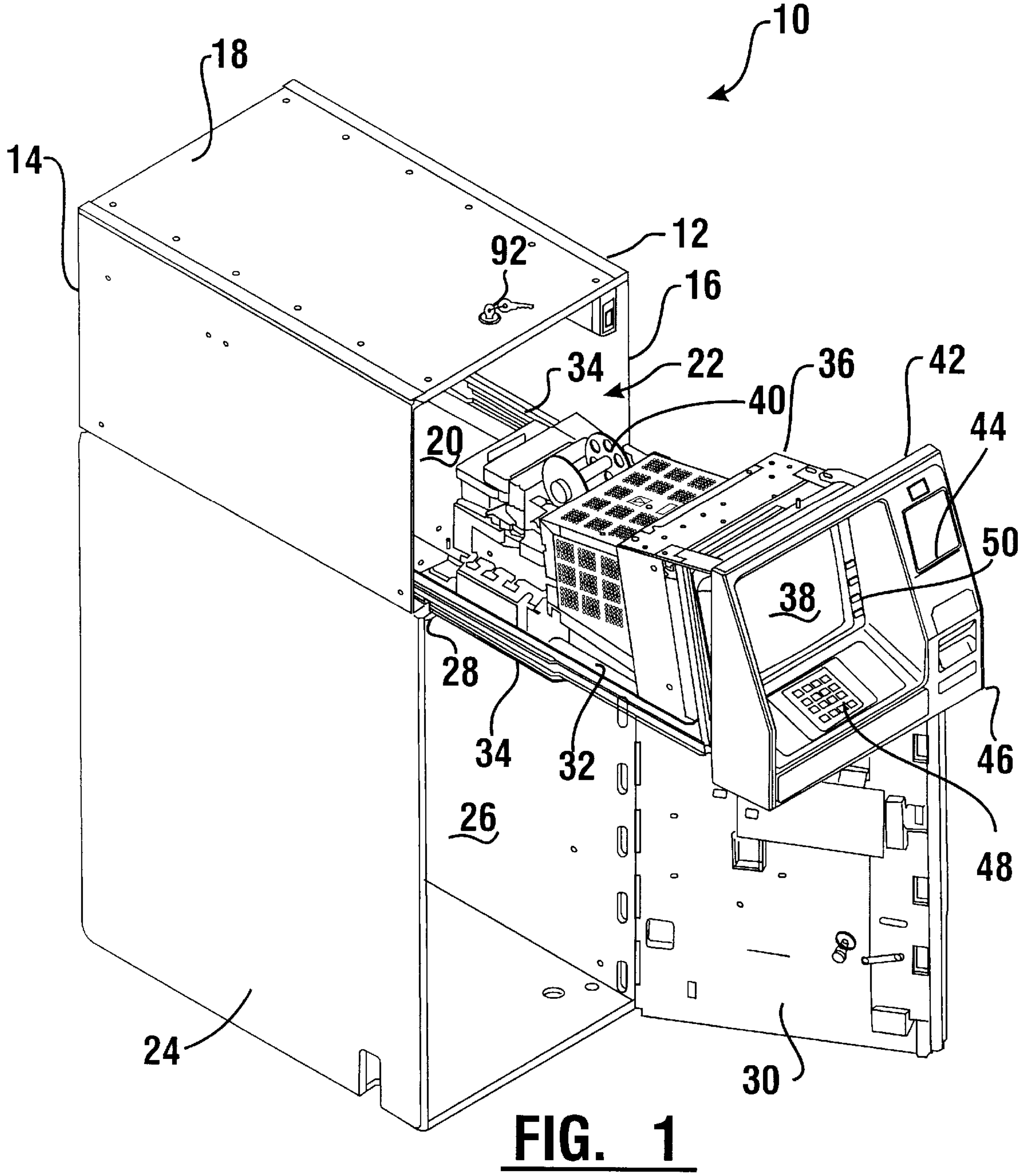
FIG. 1 is an isometric view of an automated banking machine of a preferred embodiment of the invention with a rollout tray extended and a secure chest in an open condition.

Referring now to the drawings and particularly to FIG. 1 there is shown therein an automated banking machine of a first preferred embodiment of the present invention generally indicated 10. Automated banking machine 10 is an automated teller machine (ATM). Machine 10 includes a housing 12. Housing 12 includes sidewalls 14 and 16, and a top wall 18. Housing 12 encloses an interior area indicated 20. Housing 12 has an opening 22 at the front thereof. In the first embodiment the rear of housing 12 is closed by a rear wall not shown. However in other embodiments of the invention the rear of housing 12 may be accessible through an access door or similar device.

ATM 10 further includes a chest 24. Chest 24 encloses a secure area 26. Secure area 26 is used in the preferred embodiment to house critical components and valuable documents. Specifically in the preferred embodiment secure area 26 is used for housing currency and currency dispensers. Chest 24 includes an upper wall 28 at the top thereof. Housing 12 is supported on upper wall 28 of the chest. Chest 24 also includes a chest door 30. Chest door 30 which is shown in the open condition in FIG. 1, is generally closed to secure the contents of the chest. Chest door 30 includes a lock, boltwork and a deadbolt which are used to selectively secure door 30 in the closed position. In the embodiment shown the chest door is used to close an opening positioned at the front of the chest. In other embodiments the chest opening and door may have other configurations. The chest door includes an opening therethrough and cooperates with mechanisms inside and outside the chest for passing currency or other items between a customer and devices located inside the chest.

Figure 2:
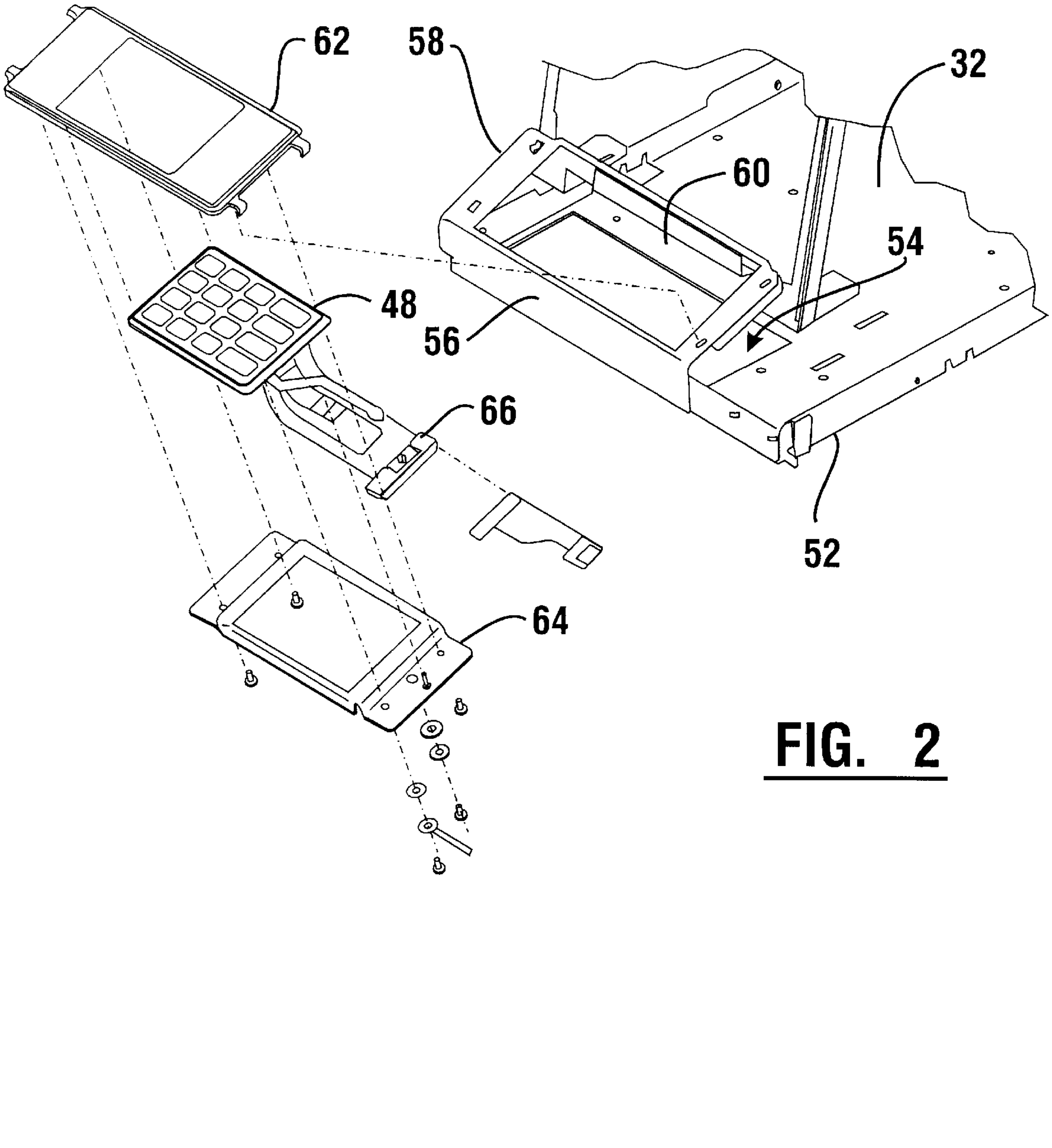
FIG. 2 is an isometric exploded view of the rollout tray and keypad mounting.
Figure 3:
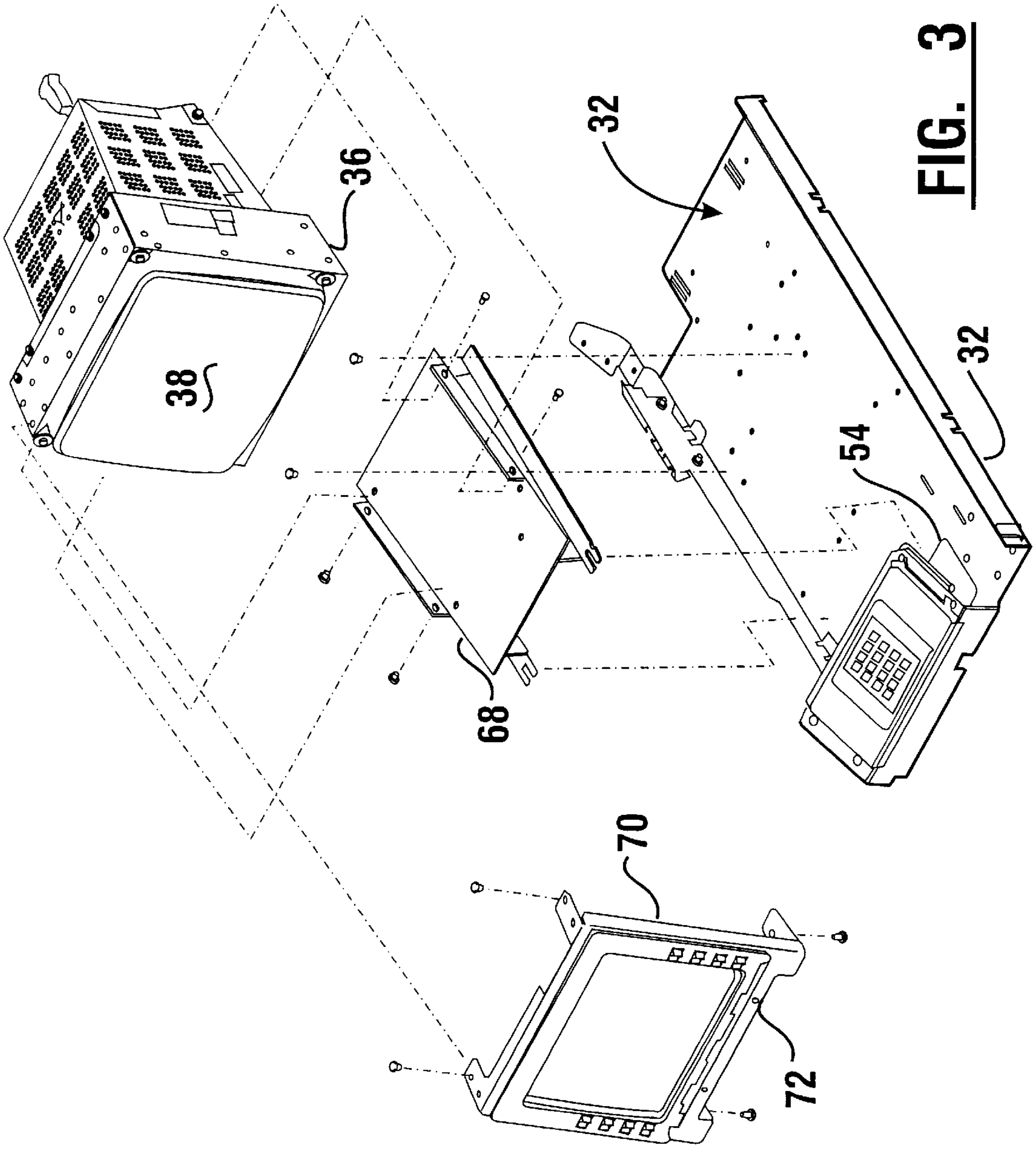
FIG. 3 is an isometric exploded view of the rollout tray, a display and its mounting.

Machine 10 further includes a rollout tray 32 (see FIGS. 2 and 3). Rollout tray 32 is movably mounted on slides 34. The slides enable moving the rollout tray from the extended position shown in FIG. 1 to a retracted position within the interior area of the housing.

Rollout tray 32 preferably has several banking machine components supported thereon. A display 36 is supported on the tray. The display 36 in the preferred embodiment is a CRT which includes a screen 38. A receipt printer 40 is also supported on the rollout tray. The receipt printer 40 is used for printing paper receipts that are delivered to customers who operate the machine 10. The receipt printer is preferably attached to a delivery and retraction mechanism of the type shown in U.S. patent application Ser. No. 08/827,567 filed Mar. 28, 1997 the disclosure of which is incorporated herein by reference. This device includes a mechanism for retracting receipts that are presented to a customer, but which are not taken.

Figure 7:
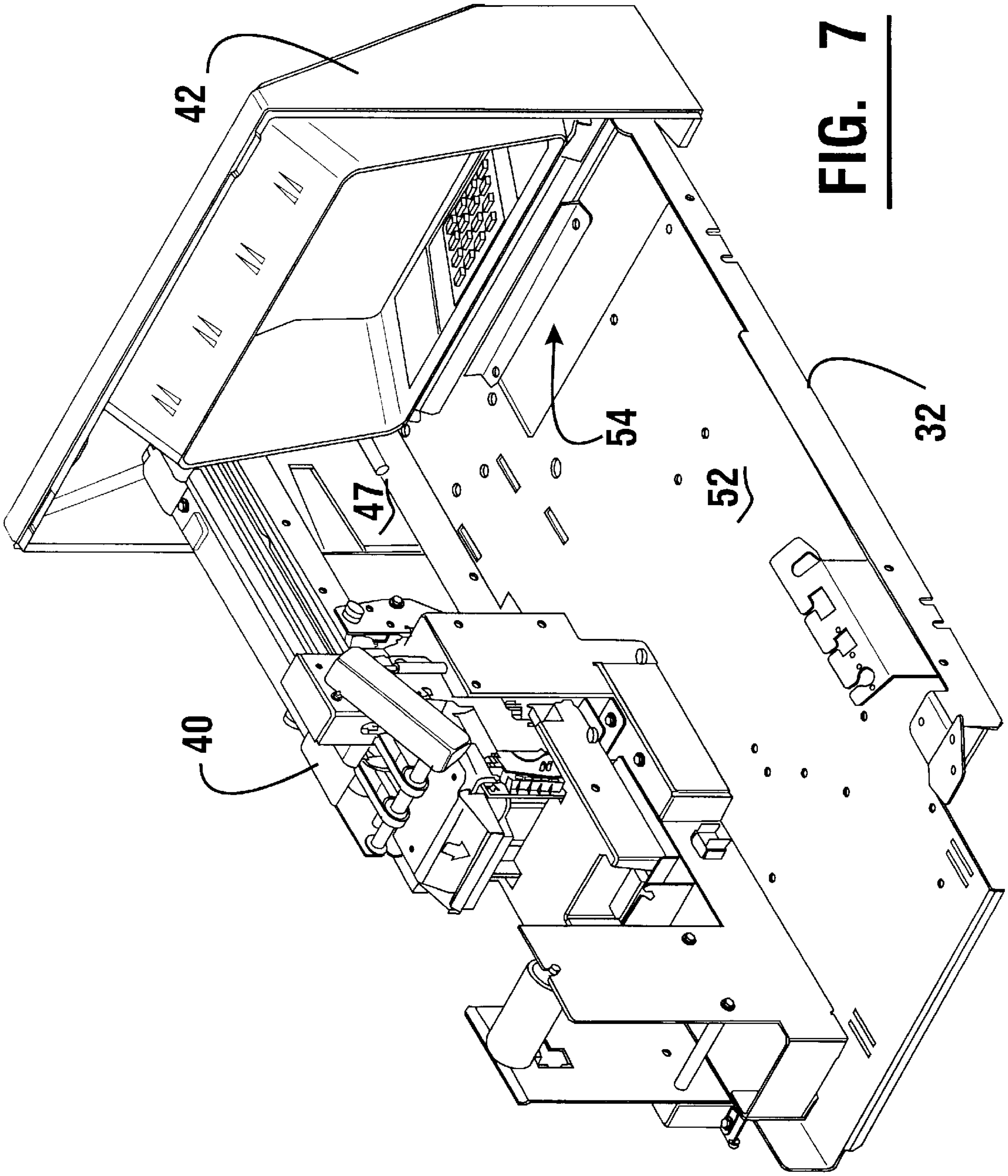
FIG. 7 is an isometric rear view of the fascia, keypad and a receipt printer of the automated banking machine.

A fascia 42 is also supported on the rollout tray. The fascia includes an opening 44 through which receipts are delivered to customers. The fascia further includes a card opening 46 through which a customer operating the machine may insert their card. Card opening 46 is connected to a card reader 47 which is also supported on the rollout tray (see FIG. 7). In the preferred embodiment the card reader is of the type that is capable of reading cards such as debit, credit and/or smart cards, and is capable of capturing and holding invalid or expired cards, and/or cards that are not taken by customers after completing their transactions. A keypad 48 is also supported on the rollout tray and is accessible through the fascia. A plurality of function buttons 50 are positioned adjacent to the screen 38.

The keypad 48, function buttons 50 and screen 38 provide an interface area for customers operating the machine. Customers respond to prompts and other messages presented by the machine by giving inputs through the keypad and the function buttons. It is a fundamental advantage of the preferred embodiment of the present invention that the screen and interface area of the ATM is relatively large compared to the overall size of the ATM.

As shown in FIG. 2, rollout tray 32 has a lower wall 52. A service opening 54 extends through the lower wall adjacent to the outer portion thereof. Tray 32 further includes an upward extending wall portion 56 and an upper wall 58 (see FIG. 8). Upper wall 58 overlies the service opening 54.

Figure 8:
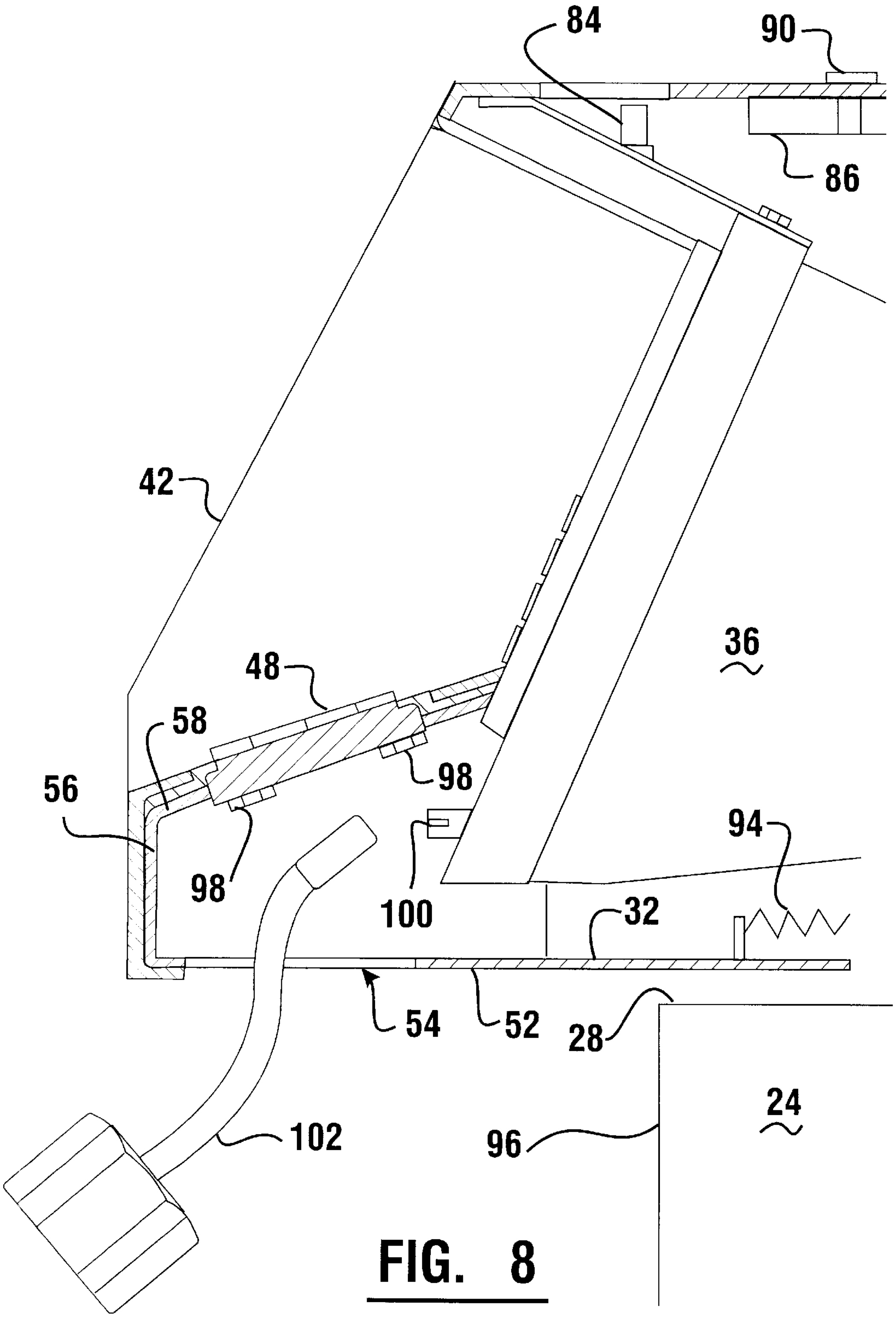
FIG. 8 is a side cross-sectional view of the rollout tray in an extended position and a tool used to access service points through the service opening.

As shown in FIG. 2, upper wall 58 includes a keypad mounting opening 60 therein. A keypad mounting plate 62 attaches to the upper wall 58 through a tab and slot arrangement. The keypad 48 is accepted in an opening in the keypad mounting plate 62 from underneath. As shown in FIGS. 2 and 8, keypad 48 includes an inwardly disposed flange which prevents it from passing through the opening in the keypad mounting plate. A keypad securing plate 64 is positioned below the keypad and the keypad mounting plate, and is secured to the keypad mounting plate by fasteners. This holds the keypad in position in the opening in the keypad mounting plate. It also enables the keypad to be released by loosening the fasteners which hold the keypad securing plate. The keypad 48 is connected to a releasible electrical connector 66 which is attachable to other circuitry in the automated banking machine.

Figure 4:
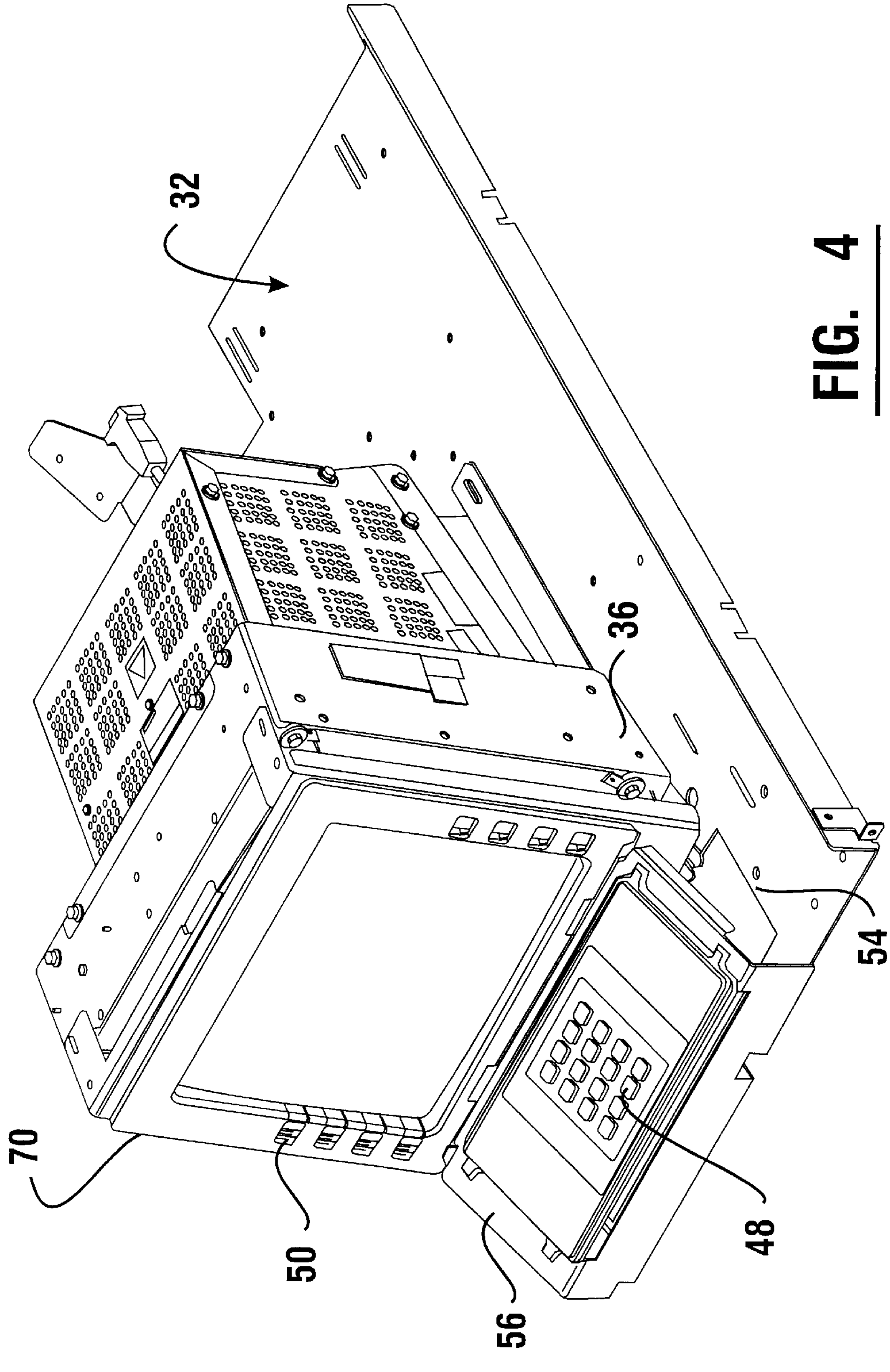
FIG. 4 is an isometric view of the display and keypad in an assembled condition.

FIG. 3 shows the manner in which the display 36 is supported on the rollout tray 32. A monitor mounting bracket 68 is attached to the rollout tray and to the display with fasteners. A surround plate 70 is also attached to the display 36 and the rollout tray. It should be noted that the surround plate attaches to the rollout tray in the inward direction relative to service opening 54. Surround plate 70 also includes a lower recess 72. As later discussed in detail, the lower recess enables image adjusting knobs which are positioned in the lower front area of the display 36 to be accessed through the service opening 54. FIG. 4 shows the components in FIG. 3 in an assembled condition.

Figure 5:
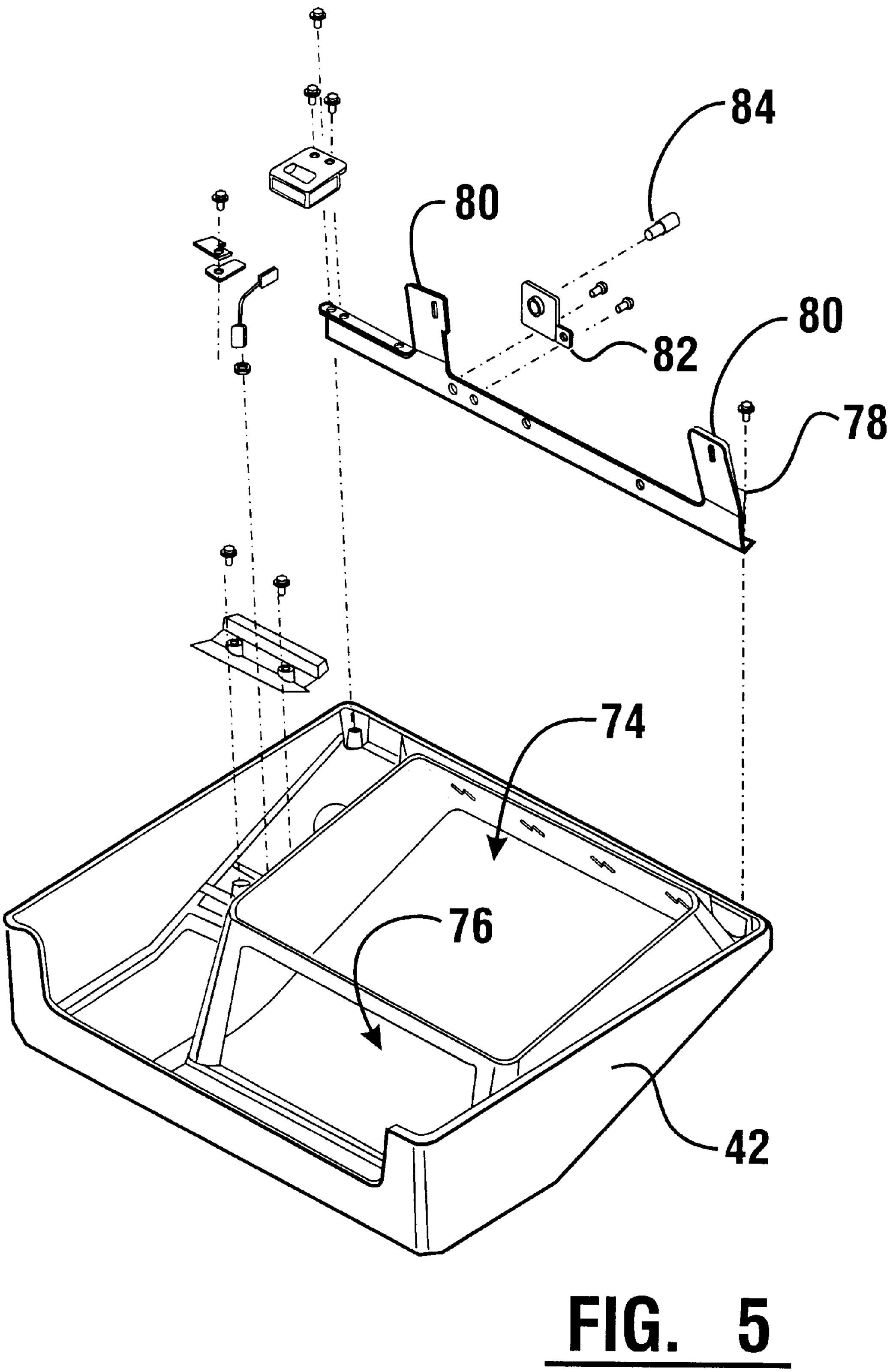
FIG. 5 is an isometric exploded back view of a fascia of the machine and locking hardware mounted thereon.

FIG. 5 shows the interior of fascia 42. Fascia 42 includes a screen opening 74 which enables viewing screen 38 of display 36. Fascia 42 further includes a keyboard opening 76. Keyboard opening 76 extends in a wall which overlies upper wall 58 and keyboard mounting plate 62 when the fascia is in the operative position.

Figure 6:
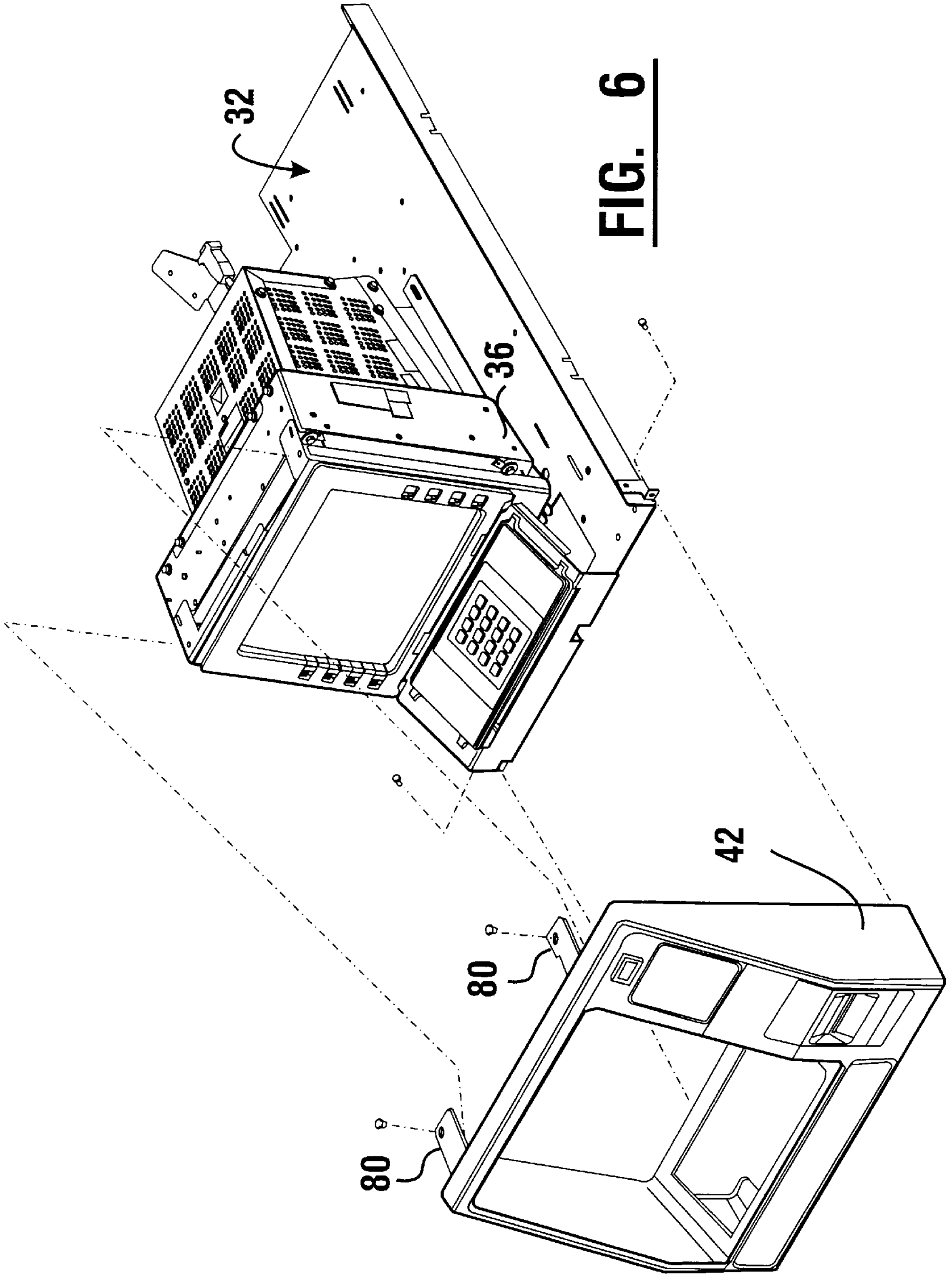
FIG. 6 is an exploded view showing the mounting of the fascia to the rollout tray.

A mounting bar 78 is attached at two locations adjacent to the top of fascia 42. Mounting bar 78 includes a pair of tabs 80. As shown in FIG. 6, tabs 80 are used to attach the mounting bar and the fascia to the surround plate and the display 36.

A locking pin support bracket 82 is attached to mounting bar 78 by fasteners. Support bracket 82 has mounted thereto a locking pin 84. As later discussed, locking pin 84 engages a pawl of a lock which selectively operates to hold the rollout tray 32 in a retracted position in the machine.

In the operative position of machine 10 the rollout tray 32 is retracted into the interior area 20 of the housing 12. In this position the inside perimeter surface of the fascia 42 is in adjacent close relation with the surfaces of walls 14, 16 and 18 bounding opening 20. The lower wall 52 of rollout tray 32 including service opening 54, is positioned above and in close fitting relation with upper wall 28 of the chest 24. As a result opening 54 cannot be accessed from outside the housing in this position.

Figure 9:
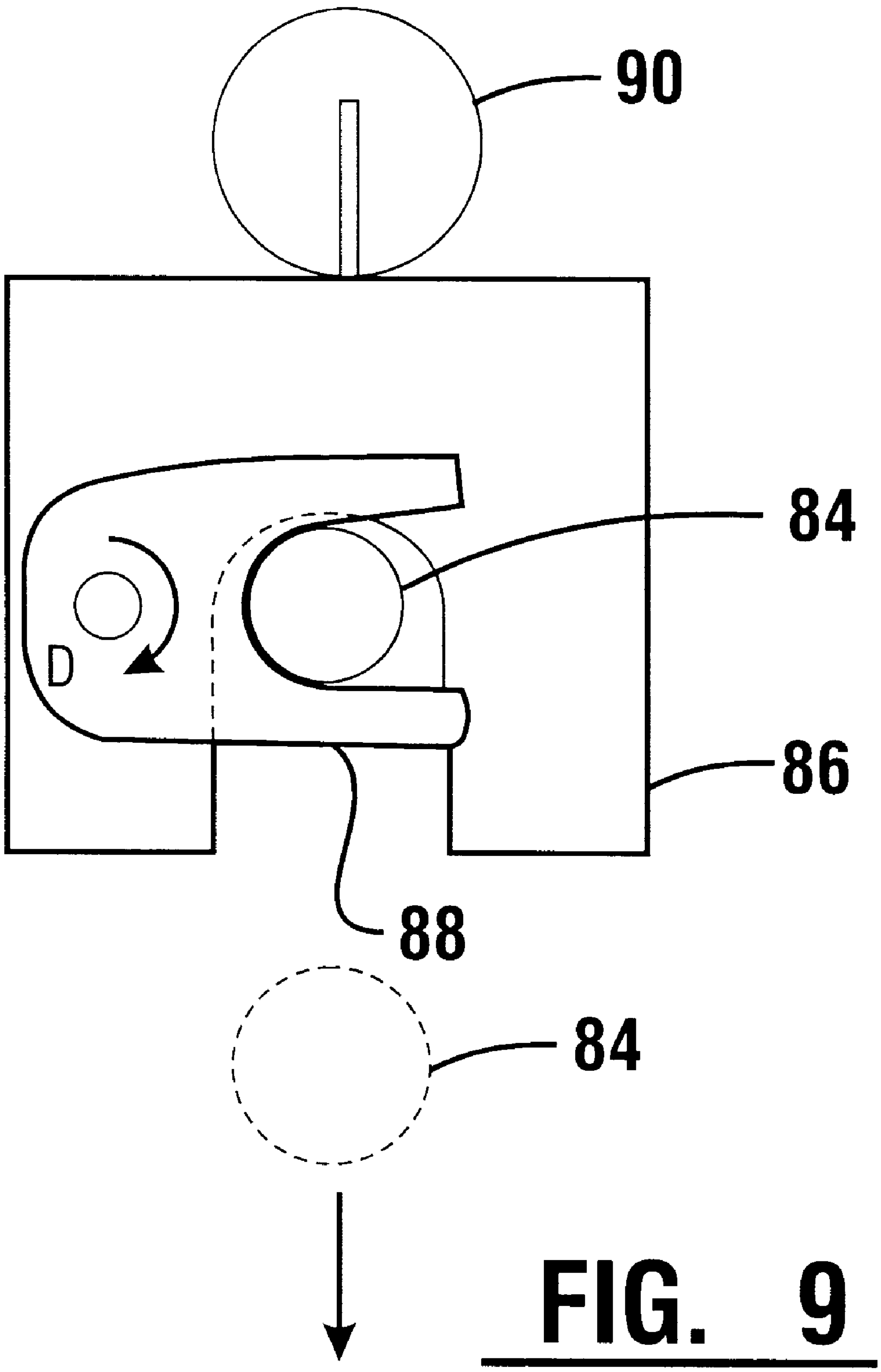
FIG. 9 is a schematic view of a locking mechanism used to lock the rollout tray in a retracted position.

The locking pin 84 in the retracted position of the rollout tray is accepted into a recess of a lock 86 as shown in FIG. 9. The locking pin 84 when positioned in the recess may be releasibly held by a pawl 88. Pawl 88 may be selectively held in engagement with pin 84 as shown in FIG. 9 to hold rollout tray 32 in the retracted position. Lock 86 is in operative connection with a key cylinder 90. Key cylinder 90 is moved to lock and release the pawl of lock 86. Key cylinder 90 is moved using a key 92 as shown in FIG. 1. When pin 84 is released by the lock it is enabled to move in a forward direction as indicated in phantom in FIG. 9.

The slides 34 on which rollout tray 32 is mounted to the housing are preferably biased outward by springs. This is schematically indicated by spring 94 in FIG. 8. As a result when the lock 86 is changed from the condition in which it holds the locking pin 84, to a condition in which it releases the locking pin, the rollout tray moves forward as represented in FIG. 8. As the rollout tray 32 moves forward, service opening 54 moves outward beyond a face 96 of chest 24. In this position the service points which are located between lower wall 52 and upper wall 58 may be accessed through opening 54 from underneath. In the embodiment shown the service points include fasteners 98 holding the keypad in position. The removal of fasteners 98 which hold the keypad securing plate 64 enables the keypad to be disengaged from the upper wall. The keypad may be disconnected electrically and removed from the machine through the service opening 54. The keypad may thereafter be subsequently replaced with another keypad. This facilitates replacing a keypad which has worn out or malfunctioned.

Display 36 includes image adjusting knobs 100. The image adjusting knobs are used to adjust the picture provided by the display. Typically such adjustments include brightness, contrast and hue, for example. The image adjusting knobs in the preferred embodiment are accessible through the lower recess 72 in the surround plate 70, which enables them to be accessed through the service opening 54.

FIG. 8 shows a tool 102 with a flexible stem which includes an aperture or recess for accepting the image adjusting knobs therein. Such a tool enables turning the adjusting knobs when the tool is extended upwardly through the service opening 54. Of course other tools may be used for purposes of contacting and moving service points such as fasteners 98 and knob 100.

The service access opening in the lower wall of the rollout tray enables the components of the interface area of ATM 10 to be compactly positioned while still providing a large interface area for the machine. The construction of the preferred embodiment further provides resistance to tampering as the service opening 54 is rendered inaccessible when the rollout tray is retracted into the machine. Of course in other embodiments other arrangements may be used to provide such an improved customer interface while achieving enhanced service access.

Of course it should be understood that rollout tray 32 may be extended to the degree necessary for a service person to work on all of the components supported thereon as shown in FIG. 1. The preferred embodiment renders the components supported on the tray readily accessible. This includes accessing areas where cards captured by the card reader, as well as areas where retracted receipts or other items are stored, so that such items may be accessed form outside the housing and removed. Repair or replacement of components supported on the rollout tray may be accomplished quickly and easily. If it is desired to replace an entire assembly, the complete tray may be removed and another tray with components thereon substituted.

When servicing is completed the rollout tray may be moved into the machine until the locking pin 84 engages the lock 86. In this position the machine is ready for operation by customers.

Figure 10:
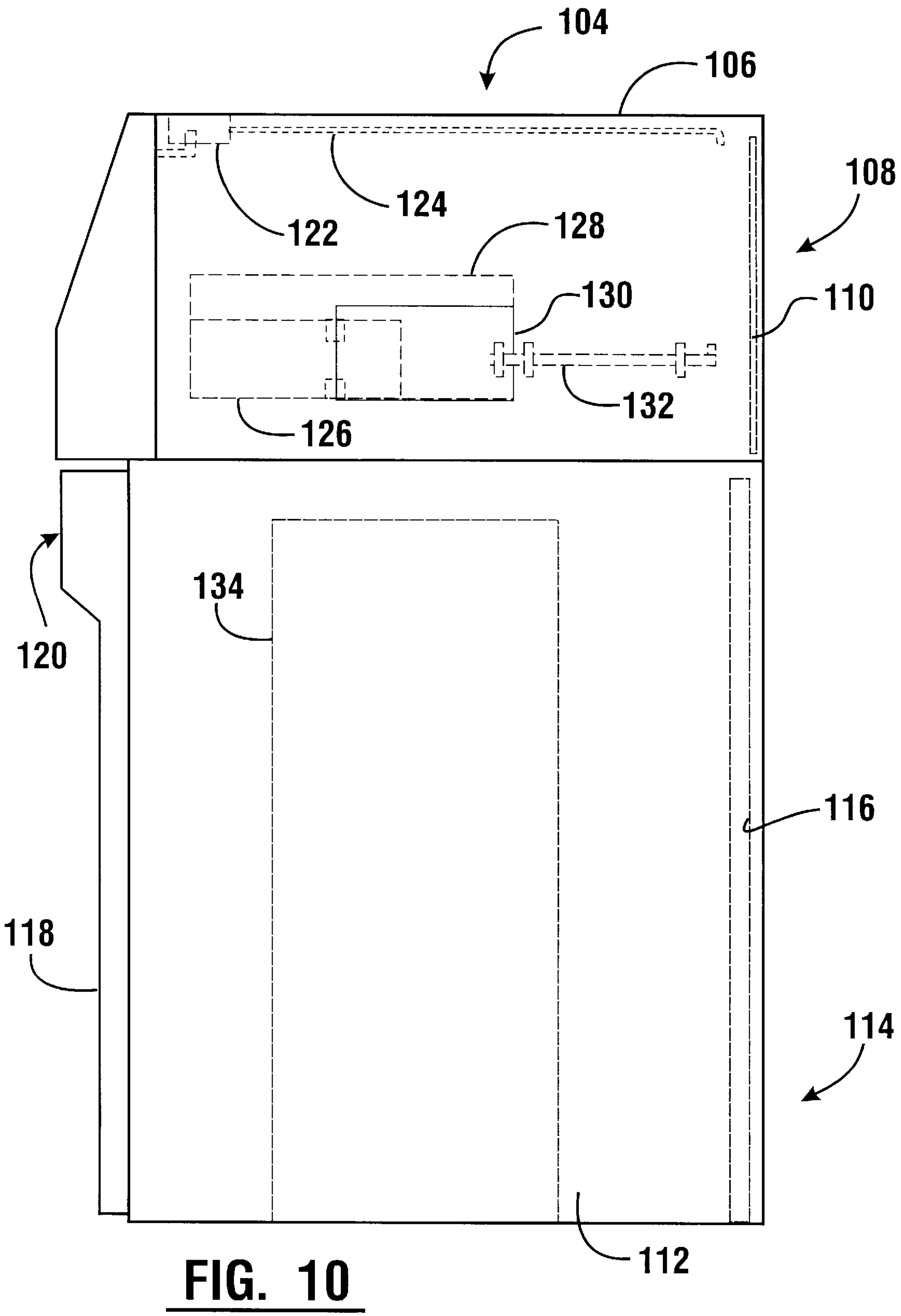
FIG. 10 is a side schematic view of alternative form of an automated banking machine shown installed in a counter or teller line.

An alternative embodiment of an automated banking machine generally indicated 104 is shown in FIG. 10. Machine 104 is similar to machine 10 except as otherwise indicated.

Machine 104 has a housing 106 which is similar to housing 12. However housing 106 differs from housing 12 in that it includes a rear opening 108 that can be accessed through a rear door 110. Rear door 110 preferably has a locking device (not shown) in operative connection therewith which is used for restricting access to the interior area of the housing to authorized persons.

Machine 104 also includes a secure chest 112 similar to chest 24. Chest 112, unlike chest 24, has a rear opening 114. Access to the interior area of the chest is controlled by a chest door 116. Chest door 116 includes a suitable locking mechanism for restricting access thereto, like that used in the first embodiment. Chest 112 includes a generally fixed front panel 118. Front panel 118 has a delivery area 120 thereon through which currency or other items may be passed to and from mechanisms housed within the chest. As in the case with machine 10, this is done through an opening using mechanisms that pass currency or other items through the opening.

Housing 106 differs from housing 12 in that it includes a locking mechanism 122. Unlike lock 86, locking mechanism 122 may be unlocked by moving a lever 124 which is accessible in the interior area of housing 12, located preferably just inside opening 108. As a result, once door 110 has been opened, lever 124 can be moved to unlock the lock 122. This enables the front fascia and the roll out tray to be moved forward in the manner of the previously described embodiment. This enables servicing the components from the front of the machine. In alternative embodiments lock 122 may be in connection with a key cylinder to enable unlocking either from the front of the machine using a key, or from the rear of the machine using lever 124 once door 110 has been opened.

Like the previously described embodiment, machine 104 includes a card reader, which is schematically indicated 126. Machine 104 also preferably includes a mechanism like the first embodiment that delivers receipts or other papers to customers, and in some selected circumstances retracts the receipts or other papers back into the machine. The receipt delivery and retraction mechanism is schematically indicated 128 in FIG. 10.

Machine 104 includes a side door 130 on housing 106. Side door 130 is preferably mounted on hinges and is movable to enable access through an opening in the side wall of the housing. Door 130 is normally held in a closed condition by a locking mechanism. The locking mechanism can be actuated by a lever 132 inside housing 106.

Side door 130 is preferably positioned so that when it is opened, and the roll out tray is in the retracted position, the card reader 126 and the receipt retraction mechanism 128 may be accessed through the opening. Preferably, with door 130 open, a service person is enabled to access the area of the card reader where captured cards are held. Such captured cards are those retained by the machine in an area in or in connection with the card reader. Such cards may include for example invalid cards, cards reported stolen or cards that a user forgot to take when they completed their transactions. Opening side door 130 enables a serviceperson to remove such cards.

Side door 130 also enables a serviceperson to gain access to receipt or other papers that were not taken by customers, and which were retracted by mechanism 128 back into a storage area. The serviceperson may remove these receipts with door 130 open. Once retained cards and retracted receipts are removed, door 130 may be closed and secured. In the embodiment shown door 130 may be opened only by actuating a lever located inside the housing which reduces the risk of unauthorized access. In other embodiments door 130 may be controlled by a key or other type lock that can be actuated from the exterior of the housing with a key or by other methods. In still other embodiments door 130 may be opened separately by each of an actuator inside the housing and an externally actuatable key lock or another type lock.

Machine 104 may be installed through a counter 134. Counter 134 may be for example a service counter or a bank teller line. Machine 104 could be installed in or adjacent to a bank teller station. In this configuration most routine servicing of the machine may be done by personnel located behind the counter 134. Such activities may include replenishing cash for delivery to customers, which may be accomplished after opening chest door 116. Similarly replenishment of paper supplies for printing receipts and a journal of transactions may preferably be accomplished after opening door 110. Captured cards and retracted receipts are also preferably accessible by a service person standing behind counter 134 once door 130 is open. Of course these same functions can also be accomplished from the front of the machine by moving the fascia and roll out tray outward in the manner previously described, after unlocking lock 122. Of course additional servicing activities may be accomplished by accessing components on the roll out tray.

While the preferred embodiments of the invention include particular structures to achieve the desirable results, those having skill in the art may devise numerous other embodiments with other structures which employ the same inventive principles described herein and which are encompassed by the subject matter as claimed. Further, while cards and receipts are described as items which are taken from customers or retracted by the machine and held in storage, in other embodiments other types of items such as tickets, cash, vouchers, travelers checks, coupons and similar items may be retracted, stored and accessed by authorized persons.

Thus the preferred embodiment of the present invention achieves the above stated objectives, eliminates difficulties encountered in the use of prior devices, solves problems and attains the desirable results described herein.

In the foregoing description certain terms have been used for brevity, clarity and understanding. However no unnecessary limitations are to be implied therefrom because such terms are for descriptive purposes and are intended to be broadly construed. Moreover the descriptions and illustrations herein are by way of examples and the invention is not limited to the exact details shown and described.

In the following claims any feature described as a means for performing a function shall be construed as encompassing any means capable of performing the recited function, and shall not be deemed limited to the particular means shown as performing that function in the foregoing description or mere equivalents thereof.

Having described the features, discoveries and principles of the invention, the manner in which it is constructed and operated, and the advantages and useful results attained; the new and useful structures, devices, elements, arrangements, parts, combinations, systems, operations, methods and relationships are set forth in the appended claims.

We claim:

1. An automated banking machine apparatus comprising:

a housing bounding an interior area, the housing having a first opening to the interior area;

a rollout tray movably supported on the housing, the rollout tray including a wall portion, a service opening extending through the wall portion, wherein the rollout tray is movable between a first position wherein the tray extends outward from the first opening and the service opening is accessible from outside the housing, and a second position wherein the tray is within the interior area and the service opening is not accessible from outside the housing;

a first serviceable component mounted in supporting connection with the tray and overlying the service opening, the serviceable component having a service point, and wherein the service point is accessible from outside the housing by extending a tool upwardly through the service opening when the tray is in the first position.

2. The apparatus according to claim 1 wherein the tray includes a lower wall, and wherein the service opening extends through the lower wall.

3. The apparatus according to claim 1 wherein the first serviceable component includes a display and wherein the service point comprises an image adjusting knob of the display.

4. The apparatus according to claim 3 and further comprising a removable keypad, wherein the removable keypad overlies the service opening in an operative position of said keypad, and wherein the keypad is removable through the service opening when the tray is in the first position.

5. The apparatus according to claim 1 wherein the first serviceable component includes a keypad, wherein the keypad overlies the service opening in an operative position of the keypad, and wherein the keypad is removable through the service opening when the tray is in the first position.

6. The apparatus according to claim 1 and further comprising an upper wall in supporting connection with the tray, the wall disposed above the service opening, wherein the service point is disposed between the wall and the service opening.

7. The apparatus according to claim 6 wherein the first serviceable component includes a keypad, wherein when the keypad is in an operative position the keypad is in supporting connection with the upper wall, and wherein the keypad is removable through the service opening when the tray is in the first position.

8. The apparatus according to claim 7 wherein the upper wall includes an access opening, and wherein the keypad extends through the access opening in the operative position.

9. The apparatus according to claim 7 and further comprising a display, the display mounted in supporting connection with the tray, wherein the display includes an image adjustment knob, and wherein the image adjustment knob is disposed below the upper wall.

10. The apparatus according to claim 1 and further comprising a fascia in supporting connection with the tray, and wherein the fascia covers the first opening when the tray is in the second position.

11. The apparatus according to claim 10 and further comprising a spring biasing the tray towards the first position, and a lock enabling selectively holding the tray in the second position, wherein upon releasing the lock the tray moves from the second position, whereby the fascia is disposed from the first opening upon release of the lock.

12. The automated banking machine according to claim 10 wherein the housing further includes a second opening, and an access door movably mounted relative to the housing, wherein the access door is selectively movable between a closed position wherein the access door closes the second opening and an open position wherein the access door is disposed away from the second opening, and further comprising a lock in the interior area of the housing, wherein the lock enables selectively housing the tray in the second position, or releasing the tray to move to the first position, and further comprising an actuating lever in the interior area of the housing, wherein the lever is in operative connection with the lock, and wherein movement of the lever is operative to release the tray and move it toward the first position.

13. The automated banking machine according to claim 12 and further comprising a lock actuator, wherein the lock actuator is in operative connection with the lock and is accessible from an exterior area of the housing, and wherein operation of the lock actuator is operative to release the tray to move toward the first position, wherein the tray may be released to move to the first position by either actuation of the actuator or movement of the lever.

14. The automated banking machine according to claim 13 wherein the lock actuator includes a key cylinder, and wherein the lock actuator is selectively actuatable by a key.

15. The automated banking machine according to claim 14 wherein the card reader device includes a capture area in which captured cards are held, and wherein the capture area is accessible through the housing service opening when the rollout tray is in the second position, and the capture area is accessible from outside the housing when the rollout tray is moved to the first position.

16. The apparatus according to claim 1 wherein the machine further comprises a chest positioned below the interior area, and wherein the service opening is disposed outward and above the chest when the tray is in the first position.

17. The apparatus according to claim 16 wherein the interior area is disposed above the chest.

18. The automated banking machine according to claim 1 and further comprising a card reader device in supporting connection with the rollout tray, and further comprising a housing service opening in the housing, and further comprising a service door movably mounted relative to the housing and selectively movable between a covering position wherein the service door blocks access through the housing service opening, and an uncovering position wherein the interior area of the housing is accessible through the housing service opening, and further comprising a locking mechanism selectively holding the service door in the covering position, and wherein when the rollout tray is in the second position the card reader device is positioned adjacent to the housing service opening and is accessible through the housing service opening when the service door is in an uncovering position, and wherein when the rollout tray is moved to the first position the card reader device is accessible from outside the housing.

19. The automated banking machine according to claim 1 and further comprising a receipt retraction mechanism in supporting connection with the rollout tray, and further comprising a housing service opening in the housing, and further comprising a service door movably mounted relative to the housing and selectively movable between a covering position wherein the service door blocks access through the housing service opening and an uncovering position wherein the interior area of the housing is accessible through the housing service opening, and further comprising a locking mechanism selectively holding the service door in the covering position, and wherein when the rollout tray is in the second position the receipt retraction mechanism is positioned adjacent to the housing service opening and is accessible through the housing service opening when the service door is in the uncovering position, and wherein when the rollout tray is moved to the first position the receipt retraction mechanism is accessible from outside the housing.

20. A method comprising the steps of:

extending a rollout tray from a housing of an automated banking machine, the rollout tray having a lower wall portion with a service opening extending therethrough and having a serviceable component supported by the tray, wherein the service opening becomes accessible by a tool from outside the housing when the tray is extended; and accessing a service point on the serviceable component by extending the tool upwardly through the service opening.

21. The method according to claim 20 wherein the serviceable component comprises a display, and wherein the service point comprises an image adjusting knob on the display, and further comprising the step of moving the image adjusting knob with the tool.

22. The method according to claim 20 wherein the rollout tray has an upper wall supported thereon, and wherein the upper wall overlies the service opening, and wherein the serviceable component is supported on the upper wall, and further comprising the step of removing the serviceable component through the service opening.

23. The method according to claim 21 wherein the serviceable component comprises a keypad and further comprising the step of removing the keypad through the service opening.

24. The method according to claim 20 and further comprising prior to the extending step, the steps of:

biasing the tray toward the extending position with a biasing mechanism;

holding the tray in a retracted position in the housing by operatively engaging the tray and a locking mechanism; and releasing the locking mechanism, wherein the tray moves responsive to the biasing mechanism.

25. A method comprising the steps of:

a) delivering a first item from an automated banking machine to a delivery position wherein the first item is accessible from outside a housing of the machine, the item being delivered by a device in supporting connection with a rollout tray;

b) retracting the first item with the device to a storage area located inside the housing of the machine and supported on the rollout tray; and c) moving a service door supported on a side of the housing to open a first service opening and removing the first item from the storage area through the first service opening while the rollout tray is within the housing;

repeating steps (a) and (b) with a second item;

extending the rollout tray outward from the housing through a second opening in the housing such that the storage area is accessible from outside the housing, and removing the second item from the storage area when the rollout tray is extended outside the housing.

26. An automated banking machine apparatus comprising:

a housing bounding an interior area, the housing having a first opening to the interior area;

a rollout tray movably mounted in supporting connection with the housing, the rollout tray including a service opening, wherein the rollout tray is movable between a first position wherein the tray extends outward from the first opening and the service opening is accessible from outside the housing, and a second position wherein the tray is within the interior area and the service opening is not accessible from outside the housing;

a serviceable component mounted in supporting connection with the tray, the serviceable component having a service point, and wherein the service point is accessible from outside the housing through the service opening when the tray is in the first position;

an upper wall in supporting connection with the tray, the wall disposed above the service opening, wherein the service point is disposed between the wall and the service opening.

27. An automated banking machine apparatus comprising:

a housing bounding an interior area, the housing having a first opening to the interior area;

a rollout tray movably mounted in supporting connection with the housing, wherein the rollout tray is movable between a first position wherein the tray extends outward from the first opening and wherein a service opening is accessible from outside the housing, and a second position wherein the tray is generally within the interior area and the service opening is not accessible from outside the housing;

a serviceable component mounted in supporting connection with the tray, the serviceable component having a service point, and wherein the service point is accessible from outside the housing through the service opening when the tray is in the first position;

a fascia in supporting connection with the tray, and wherein the fascia generally covers the first opening when the tray is in the second position.

28. An automated banking machine apparatus comprising:

a housing bounding an interior area, the housing having a first opening to the interior area;

a rollout tray movably mounted in supporting connection with the housing, wherein the rollout tray is movable between a first position wherein the tray extends outward from the first opening and wherein a service opening is accessible from outside the housing, and a second position wherein the tray is generally within the interior area and the service opening is not accessible from outside the housing;

a serviceable component mounted in supporting connection with the tray, the serviceable component having a service point, and wherein the service point is accessible from outside the housing through the service opening when the tray is in the first position;

a spring biasing the tray towards the first position, and a lock enabling selectively holding the tray in the second position, wherein upon releasing the lock the spring is operative to cause the tray to move from the second position towards the first position.

29. An automated banking machine apparatus comprising:

a housing bounding an interior area, the housing having a first opening to the interior area;

a rollout tray movably mounted in supporting connection with the housing, the rollout tray including a wall portion in supporting connection with the rollout tray, a service opening extending through the wall portion, wherein the rollout tray is movable between a first position wherein the tray extends outward from the first opening and the service opening is accessible from outside the housing, and a second position wherein the tray is generally within the interior area and the service opening is not accessible from outside the housing;

a serviceable component mounted in supporting connection with the tray, the serviceable component having a service point, and wherein the service point is accessible by a tool from outside the housing through the service opening when the tray is in the first position.

30. A method comprising the steps of:

(a) extending a rollout tray outward from a first opening of a housing of an automated banking machine, the rollout tray including a service opening, wherein an upper wall is in supporting connection with the tray and disposed above the service opening, and a serviceable component is mounted in supporting connection with the tray, the serviceable component having a service point disposed between the upper wall and the service opening; and (b) subsequent to step (a) accessing the service point by extending a tool upward through the service opening.

31. A method comprising the steps of:

(a) moving a fascia of an automated banking machine outward relative to a housing of the machine, wherein the fascia is moved outward in supporting connection with a rollout tray, the rollout tray being in supporting connection with the housing, and wherein a serviceable component is mounted in supporting connection with the tray, and the tray includes a service opening to a service point on the serviceable component, and wherein the service opening is generally inaccessible from outside the housing and becomes accessible from outside the housing when the fascia is moved outward in supporting connection with the tray;

(b) subsequent to step (a) accessing the service point on the serviceable component by extending a tool upward through the service opening; and (c) subsequent to step (b) moving the fascia toward the housing in supporting connection with the rollout tray wherein the service opening becomes inaccessible from outside the housing.

* * * * *